3,016,532
TOW TARGET
Bruce E. Del Mar, Pacific Palisades, Calif., assignor to Del Mar Engineering Laboratories, Los Angeles, Calif., a corporation of California
Filed Feb. 25, 1957, Ser. No. 641,929
3 Claims. (Cl. 343—18)

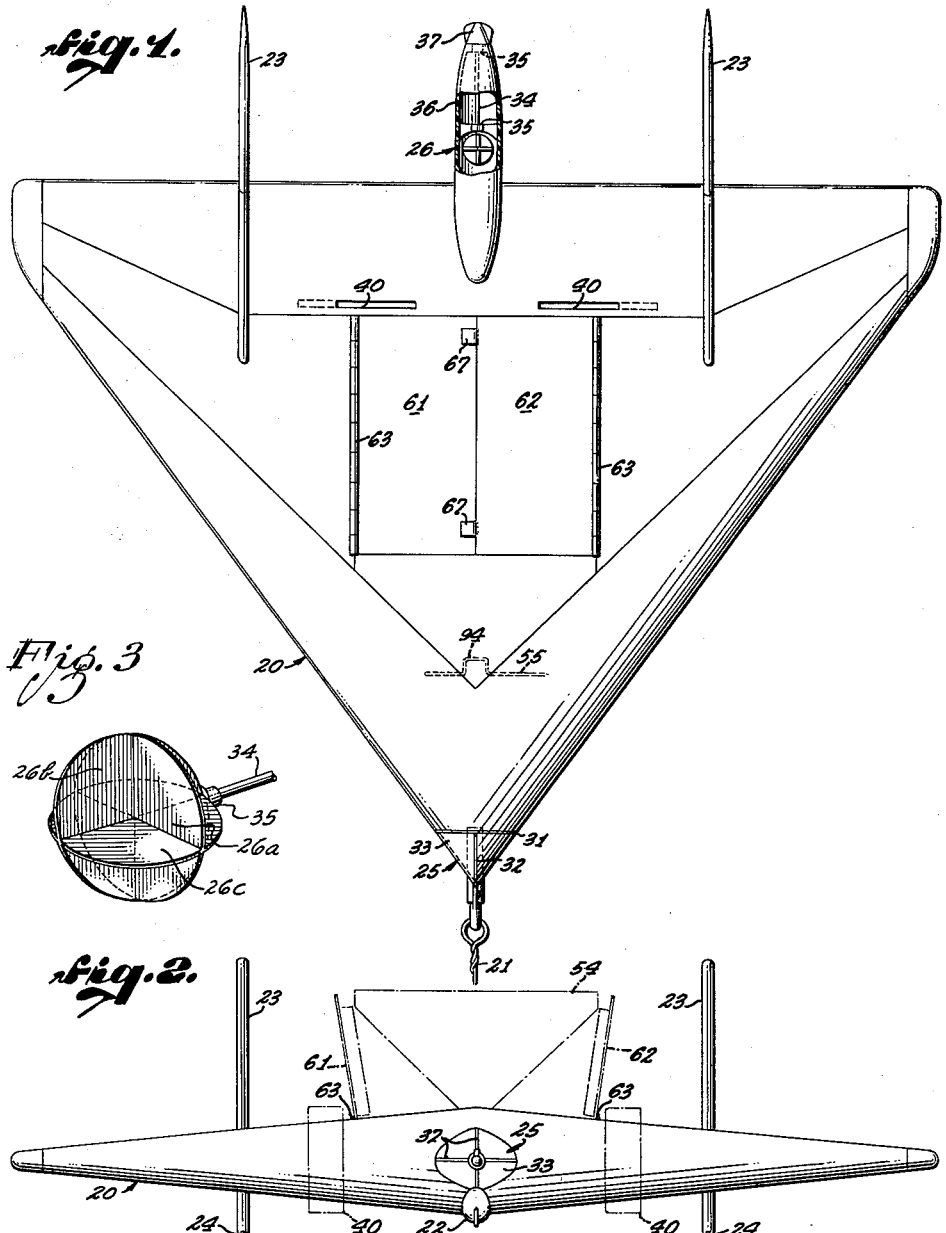

This invention relates to an aerial target to be towed by aircraft for military training purposes as well as for carrying out various tests and experiments. The invention is particularly directed to improvements in such a device to meet certain problems relating to tracking the target with radar. The present application is a continuation-in-part of my co-pending application Ser. No. 405,090, now Patent No. 2,898,058, filed January 20, 1954, entitled Tow Target.

The invention has special utility for providing realistic target experience for fighter pilots, interceptor pilots and various other military personnel and especially in organized team work for detecting, tracking and destroying aerial targets. To this end, a basic concept of the invention is the rotation of the radar corner reflector means on an aerial tow target.

One of the advantages of rotating radar corner reflectors on a tow target is that the resulting reflection behavior of the tow target is of the same general character as the radar reflection behavior of an actual enemy aircraft. The inevitable slight oscillations and fluctuating directional changes of an aircraft in flight causes corresponding changes in position and effectiveness of the corner reflecting surfaces of the aircraft and the rotating radar corner reflectors on a tow target of the present invention have the same general effect on a viewer screen of a radar receiver.

One of the problems in the use of tow targets for this purpose is to make sure that the reflectivity of the tow target does not exceed the reflectivity that would be encountered in actual warfare. It should be just as difficult to detect a tow target in target practice as to detect an enemy aircraft in actual warfare. To this end, the rotation of the radar corner reflectors of a tow target is important in preventing undue prolongation of any high magnitude reflection, the ratio of the intensity of a reflected radar signal from a corner reflector relative to the intensity of the incident radar signal varying with the direction of the incident signal relative to the corner reflector.

Another advantage attained by rotating a series of circumferentially arranged radar corner reflectors is that the intensity of the over-all radar reflection pulsates at a frequency equal to the r.p.m. of the circumferential series times the number of corner reflectors in the series and this frequency may be known in advance. In the present invention, a circumferential series of radar reflectors is rotated by aerodynamic means deriving power from the air stream adjacent the tow target. The aerodynamic means comprises a circumferential series of angled vanes acted upon by the air stream and in this instance, the vanes comprise blades of an air turbine carried by the tow target. The r.p.m. of the air turbine may be ascertained for given air speeds of the tow target so that a selected frequency of pulsation may be maintained by towing the target at a given air speed. The pulsation of the over-all reflected radar signal at a predetermined frequency enables personnel in target practice maneuvers to make sure that it is the tow target that is being intercepted, not the towing aircraft or any other aircraft.

A further feature of the invention is the concept of causing the rotary series of radar corner reflectors to wobble or oscillate on its axis. This oscillation introduces a cyclic variation in the orientation of the radar reflecting surfaces that further facilitates reliable identification of the tow target to prevent erroneous interceptions.

The various features and advantages of the invention will be apparent from the following detailed description, considered with accompanying drawing.

In the drawing, which is to be regarded as merely illustrative:

FIGURE 1 is a plan view of a selected embodiment of the invention with portions broken away to reveal concealed structure;

FIGURE 2 is a front elevation of the device shown in FIGURE 1; and

FIGURE 3 is a perspective view of the rotary radar reflector unit that is used on the tow target.

The invention is applicable to any type of aerial target device that is adapted to be towed by means of a cable from an aircraft and which is of such character and value as to warrant recovery by a parachute for re-use. In the particular embodiment of the invention that has been selected for disclosure, the tow target has a hollow body or fuselage, generally designated by numeral 20, which is of triangular configuration in plan and which provides adequate aerodynamic surfaces to make the device self-sustaining when drawn through the air at appreciable velocity by a tow cable 21.

The aerial target device has a forward skid 22 for ground contact and has a pair of rear vertical stabilizers 23 the lower edges of which carry additional skids 24 for ground contact. Preferably, the tow target has a nose member, generally designated by numeral 25, which is constructed to serve as a reflector for radar signals. The tow target also has a reflector unit 26 near its trailing edge for the same purpose.

The nose number 25 may be in the form of a radar corner reflector assembly comprising a vertical transverse disc 31 and four forwardly extending vanes 32, the four vanes being mounted radially on an axial tube 30 where the tow cable 21 is connected to the target. The four vanes 32 are arranged in two planes perpendicular to each other as may be seen in FIGURE 2 so that the four vanes in combination with the transverse disc 31 provide radar reflecting surfaces in three planes perpendicular to each other. The three planes intercept each other at a central point to form four corner reflectors, each corner reflector extending over one quadrant of the circumference of the reflector assembly. The four quadrant spaces formed by the four corner reflectors may be occupied respectively by four bodies 33 of plastic material that is transparent to radar, the four bodies giving the nose member 25 a smooth streamlined outer surface.

As best shown in FIGURE 3, the reflector unit 26 on the trailing end of the tow target has the configuration of three intercepting discs 26a, 26b and 26c. The three discs are unitary with each other and are fixedly mounted on a suitable shaft 34 that rotates in two spaced bearings 35. It is apparent that the reflector unit 26 provides a forwardly facing circumferential series of four radar corner reflectors each occupying one quadrant of the circumference and additionally provides a second rearwardly facing circumferential series of four radar corner reflectors.

The shaft 34 may be rotated by any suitable means during flight. In this instance, the reflector unit 26 and the shaft 34 are mounted in a streamlined housing 36 and the shaft 34 carries a spinner or air turbine 37 having suitably angled vanes for rotation in response to the slip stream of the tow target. Preferably, the reflector unit 26 is mounted on the shaft 34 in a position out of alignment with the axis of rotation of the shaft so that the reflector unit wobbles or oscillates when rotated by the shaft. The shaft may merely be bent slightly adjacent the reflector unit for this purpose.

The tow target is provided with brake means to increase the drag of the target whenever slack tends to develop in the cable 21, and this brake means is responsive to changes in the tension of the cable. Such an automatic brake means may comprise, for example, a pair of rectangular members 40 that normally lie within the configuration of the fuselage 20 but are adapted to rotate to positions extending into the air stream as indicated in broken lines in FIGURE 2, to increase the drag on the flying target.

The invention further provides a second brake means effective to decelerate the tow target as soon as the tow target is released from the tow cable. This second brake means may comprise a forward door-like member 54 that is pivotally mounted on the target by a rod 55, the rod being of angular configuration with an offset 94.

In addition to these two brake means the tow target is provided with a parachute (not shown) that normally lies folded in a rearward parachute compartment that is closed by a pair of upper doors 61 and 62 mounted on suitable hinges 63. As shown in FIGURE 1, the door 62 has a pair of tongues 67 on its swinging edge that overlie the swinging edge of the door 61 in the closed positions of the two doors. The two doors are held closed by suitable latch means (not shown) in engagement with the door 62.

When the tow target is drawn through the air by means of the tow cable 21, the rectangular brake members 40 function automatically to vary the drag for maintaining the tow cable taut at whatever speed the towing aircraft flies. The air turbine 37 is acted upon by the slip stream to rotate the radar corner reflector unit so that four forwardly facing corner reflectors and four similar rearwardly facing corner reflectors rotate in unison with the effects and advantages heretofore mentioned.

My description of the selected embodiment of the invention will suggest various changes, substitutions and other departures from my disclosure within the spirit and scope of the appended claims.

I claim:
1. An aerial tow target for connection with a tow line for tow by an aircraft, comprising: a hollow, elongate, streamlined housing formed of a material permeable by radar waves; a shaft; means for rotatably mounting said shaft within said housing and longitudinally thereof; a radar reflecting unit including at least three normally intersecting disks fixedly mounted to said shaft; vane means drivingly connected to said shaft and disposed exteriorly of said housing, said vane means being aerodynamically driven as said target is towed in flight thereof to drivingly rotate said shaft, whereby said radar reflecting unit is rotated relative to said housing in the towed flight of said target; and means carried by the forward portion of said target for attaching the target to a tow line for tow by a towing aircraft.

2. An aerial tow target as set forth in claim 1 in which the radar reflecting unit is mounted on the shaft in a position out of alignment with the longitudinal axis thereof whereby said unit wobbles when rotatably driven with said shaft.

3. An aerial tow target for connection with a tow line for tow by an aircraft, comprising: a hollow, streamlined housing formed of a material permeable by radar waves; means aerodynamically holding said housing against rotation in the towed flight of the target; three planar elements normally intersecting each other along a diametrical section of each element and forming a radar wave reflector adapted to reflect exteriorly propagated radar waves; a shaft rotatably mounted within said housing; said reflector unit being mounted to said shaft for rotation therewith; vane means disposed exteriorly of said housing and connected to said shaft for producing rotation of said shaft as said target is towed, whereby said reflector unit is rotatably driven relative to the housing in the towed flight of said target; and means carried by the forward portion of said target for attaching the target to a tow line for tow by a towing aircraft.

References Cited in the file of this patent

UNITED STATES PATENTS

| | | |
|---|---|---|
| 2,212,110 | Beuerman | Aug. 20, 1940 |
| 2,419,549 | Griesinger | Apr. 29, 1947 |
| 2,462,102 | Istvan | Feb. 22, 1949 |
| 2,463,517 | Chromak | Mar. 8, 1949 |
| 2,472,212 | Hudspeth | June 7, 1949 |
| 2,483,402 | Cotton | Oct. 4, 1949 |
| 2,525,332 | Alger | Oct. 10, 1950 |
| 2,697,828 | Heintz | Dec. 21, 1954 |
| 2,805,065 | Cotton | Sept. 3, 1957 |
| 2,823,376 | Baldwin et al. | Feb. 11, 1958 |
| 2,869,120 | Lolmaugh et al. | Jan. 13, 1959 |
| 2,898,058 | Del Mar | Aug. 4, 1959 |

FOREIGN PATENTS

| | | |
|---|---|---|
| 737,318 | Great Britain | Sept. 21, 1955 |

OTHER REFERENCES

Stockman: Proc. IRE, October 1948; "Communication by Means of Reflected Power," page 1202 of pp. 1196–1204.